United States Patent [19]

Niskanen

[11] Patent Number: 4,757,586
[45] Date of Patent: Jul. 19, 1988

[54] GLIDE-SHOE ARRANGEMENT FOR A VARIABLE-CROWN ROLL

[75] Inventor: Juhani Niskanen, Jyväskylä, Finland

[73] Assignee: Valmet Oy, Finland

[21] Appl. No.: 38,222

[22] Filed: Apr. 14, 1987

[30] Foreign Application Priority Data

Apr. 16, 1986 [FI] Finland ................................ 861612

[51] Int. Cl.$^4$ .............................................. B21B 27/00
[52] U.S. Cl. .................................. 29/116.2; 29/113.1;
    29/113.2; 29/116.1
[58] Field of Search .............. 29/116 R, 116 AD, 113,
    29/113 AD; 100/162 B; 384/111, 100, 117, 118,
    121, 122, 123, 124

[56] References Cited

U.S. PATENT DOCUMENTS

| | | | |
|---|---|---|---|
| 4,064,607 | 12/1977 | Wolf | 29/116 AD |
| 4,228,571 | 10/1980 | Biondetti | 29/116 AD |
| 4,241,482 | 12/1980 | Biondetti | 29/116 AD |
| 4,319,389 | 3/1982 | Marchioro | 29/116 AD |
| 4,328,744 | 5/1982 | Pav et al. | 29/116 AD |
| 4,404,724 | 9/1983 | Christ et al. | 29/116 AD |
| 4,457,057 | 7/1984 | Pav | 29/116 AD |
| 4,472,865 | 9/1984 | Schiel et al. | 29/116 AD |
| 4,598,448 | 7/1986 | Schiel et al. | 29/116 AD |

*Primary Examiner*—P. W. Echols
*Assistant Examiner*—Irene Cuda

[57] ABSTRACT

A glide shoe arrangement for a variable crown roll is disclosed. The roll comprises a fixed central axle on which a hollow cylindrical roll mantle is rotatably journalled. A series of piston-glide shoe arrangements are fitted along the length of the roll between the axle and the inner surface of the roll mantle and are adapted to be loaded by hydraulic pressure fluid so that each piston loads a corresponding glide shoe against the inner surface of the roll mantle to control the distribution of nip pressure in a nip formed by the variable crown roll and a counter roll. The piston-glide shoe arrangements are fitted in cylinder bores formed in the axle. Spherical surface bearings are fitted between the loading pistons and the glide shoes, the center of curvature or rotation of the bearing surfaces being located on the side of the glide shoe. A pin-shaped projection is fitted in the loading piston and extends through the spherical bearing. A sealing articulation arrangement is situated between the pin-shaped projection and either the glide shoe or a projection part attached to the glide shoe. The pressure fluid is passed through ducts from the loading space of the cylinder bore through the pin-shaped projection and into hydrostatic lubrication spaces on the glide shoe.

16 Claims, 2 Drawing Sheets

GLIDE-SHOE ARRANGEMENT FOR A VARIABLE-CROWN ROLL

BACKGROUND OF THE INVENTION

The present invention concerns a glide-shoe arrangement for a variable-crown roll, the roll comprising a non-revolving massive central axle on which a cylindrical roll mantle is journalled to rotate, with piston-glide-shoe combinations being fitted between the axle and inner face of the roll mantle and being loaded by means of hydraulic pressure. The glide shoes can be loaded against the inner face of the roll mantle by means of hydraulic fluid pressure through intermediate pistons, for the purpose of controlling the distribution of nip pressure in a nip situated to face the loading shoes. The piston-glide shoe combinations include cylindrical bores or equivalent formed in the axle, into which substantially cylindrical or equivalent pistons are fitted.

Several different types of variable-crown or adjustable-crown rolls for paper machines are known in the prior art. As a rule, these rolls comprise a massive, stationary roll axle and a roll mantle arranged to rotate about the axle. A series of glide shoes and/or chambers of pressure fluid are fitted between the axle and the mantle to act upon the inner face of the mantle. As a rule, the nips formed by such rolls, such as press nips or calendering nips, are loaded by means of loading forces applied to the axle journals of the variable-crown roll and of its counter-roll.

The present invention relates to such variable-crown or adjustable-crown rolls which include a series of glide shoes having glide faces acting upon the inner face of the roll mantle, with the glide faces being at least partially hydrostatically lubricated by means of pressure fluid passed onto the glide faces.

With respect to the prior art related to the present invention, reference is made by way of example to U.S. Pat. No. 4,241,482, Finnish Pat. Nos. 56,252 and 69,684, and to Finnish Patent Application No. 792,712.

A great number of different functions are required from the supporting and loading members used in variable-crown rolls and acting upon the inner face of the roll mantle and loaded by means of pressurized fluid. Integration of all of these functions in one and the same member has not been quite successful by means of the arrangements known in the prior art. A listing of certain of the properties required in the supporting and loading members is as follows:

the hydrostatic lubrication spaces or chambers of the support shoes as well as of the loading-shoe/cylinder must be sufficiently well-sealed even with varying load forces, and even when changes in angle occur between the mantle and the inner part of the roll;

the loading pistons of the support shoes must receive lateral forces which are caused by friction;

the loading equipment for the support shoes must be capable of functioning as an articulated joint, because the relative positions of the mantle to be supported and the central axle with respect to one another vary to a considerable extent with varying load forces;

the pistons of the support shoes must provide sufficient radial force with a variation range that must be sufficiently large in view of supporting and loading the mantle;

it must be possible to control the thickness of the oil film that lubricates the glide face of the support shoes; and the loading pistons of the support shoes and the bores provided in connection with the central axle must permit even considerable radial movement of the pistons.

In the loading and supporting members known in the prior art, the functions listed above are not all carried into effect satisfactorily, at least not all of these above-listed functions together.

SUMMARY OF THE INVENTION

Accordingly, it is an object of the present invention to avoid the above-noted drawbacks and to provide a novel and improved arrangement for fastening the glide and supporting shoes in a variable-crown or adjustable-crown roll so that the properties noted above can be attained.

It is also an object of the present invention to provide an arrangement for supporting glide shoes in which the glide shoes can be freely positioned in all directions with respect to the pistons that load the same.

It is a further object of the present invention to provide an arrangement of supporting glide shoes in which a pivot point of the glide shoes with respect to the loading pistons can be situated as close as possible to the lubricated glide face of the glide shoes, so that moment of frictional force that tends to turn the glide shoe and which is produced by the friction on the glide face, can be minimized as much as possible.

It is even another object of the present invention to provide a relative supporting arrangement between a glide shoe and a supporting piston therefor, in which pressurized fluid can be passed from a loading space of the loading piston into a lubrication space of the glide shoe, through simple and tight support-joint construction.

These and other objects are attained by the present invention which is directed to a glide shoe arrangement for a variable crown roll comprising a non-rotating central axle on which a substantially cylindrical roll mantle is rotatably journalled, at least one piston-glide shoe combination being fitted between the axle and an inner face of the roll mantle. This combination comprises a glide shoe that is adapted to be loaded against the inner face of the roll mantle by hydraulic pressure against an intermediate, loading piston for controlling distribution of pressure in a nip facing the loading shoe. The piston-glide shoe combination includes a bore or equivalent passageway made in the axle into which the loading piston is fitted.

A bearing is situated between the piston and glide shoe, having a substantially cylindrical bearing face with a center of curvature thereof being situated towards the glide shoe. A pin-shaped projection is fitted in the loading piston and extends through the bearing, while a sealing articulation arrangement is situated between the pin-shaped projection and the glide shoe or a projecting portion of the glide shoe. Hydraulic pressure fluid can pass from a loading space against the piston through the projection and into a hydrostatic lubrication space on the glide shoe facing the inner surface of the roll mantle.

Therefore, the present invention is principally characterized by bearings provided with spherical bearing faces being fitted between the loading pistons and the glide shoes, the center of curvature or rotation of the bearings (i.e.

spherical surfaces thereof) being located at the side of the glide shoe, a pin-shaped projection part is fitted in the loading pistons, and extends through the bearing, a sealed articulation arrangement is situated between the pin-shaped projection part and the glide shoe or a projection part attached to the glide shoe, and the pressure fluid can be passed from the loading space of the piston through the pin-shaped projection part and into a hydrostatic lubrication space on the glide shoe.

In accordance with the present invention, a center of rotation of the glide shoe is situated near the inner face of the roll mantle, i.e. near the glide face itself of the glide shoe, whereby friction between the roll mantle and the glide shoe causes a minimum of moment inclining the shoe.

In accordance with a preferred embodiment of the present invention, when the seal ring between the pin of the loading piston and the glide shoe or a component (projection) attached to the glide shoe is situated in a plane of a center of rotation of the glide shoe, then the seal moves as little as possible in operation. Therefore, the piston-glide shoe arrangement can be reliably sealed, while the sealing construction can be made simple.

It is a further advantage of the invention that it is possible to use standard bearings between the glide shoes and the loading pistons having low friction and favorable cost.

In the support arrangement of the present invention, it is possible to use bearings of relatively little radius of rotation, whereby the moment tending to prevent inclination of the shoe becomes as small as possible.

BRIEF DESCRIPTION OF THE DRAWINGS

The present invention will be described below in detail with reference to an exemplifying embodiment thereof illustrated in the accompanying drawings, and to which the present invention is not intended to be exclusively confined. In the drawings

DESCRIPTION OF THE PREFERRED EMBODIMENTS

Figure 1:
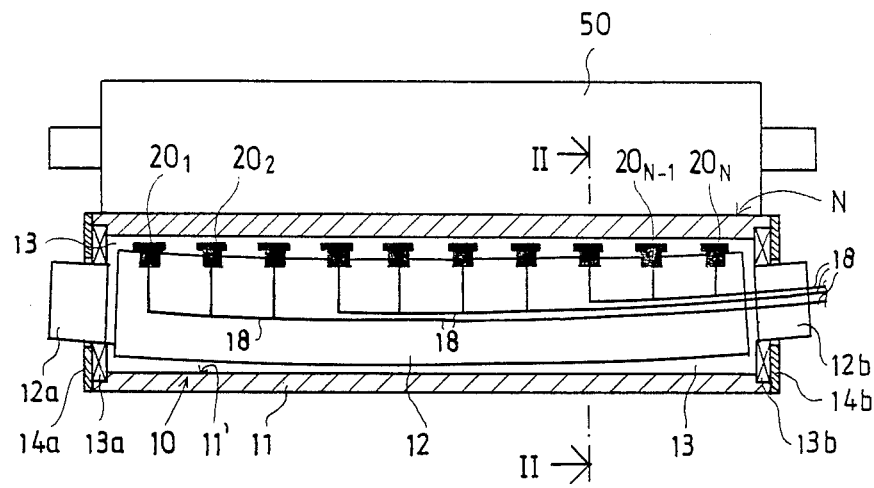
FIG. 1 is a schematic, longitudinal, sectional view of a variable-crown roll in accordance with the present invention, forming a nip with a counter-roll.
Figure 2:
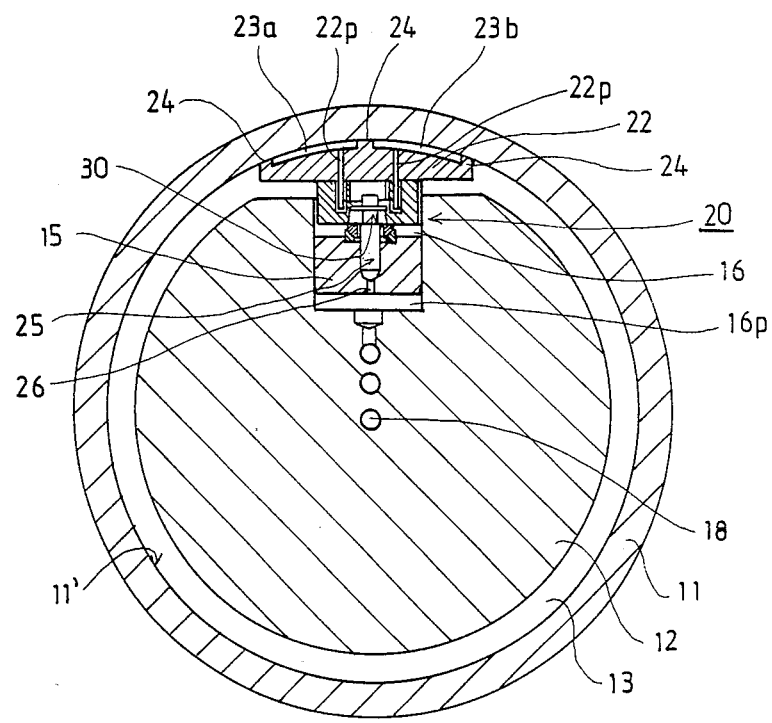
FIG. 2 is a sectional view along line II—II of FIG. 1.
Figure 3:
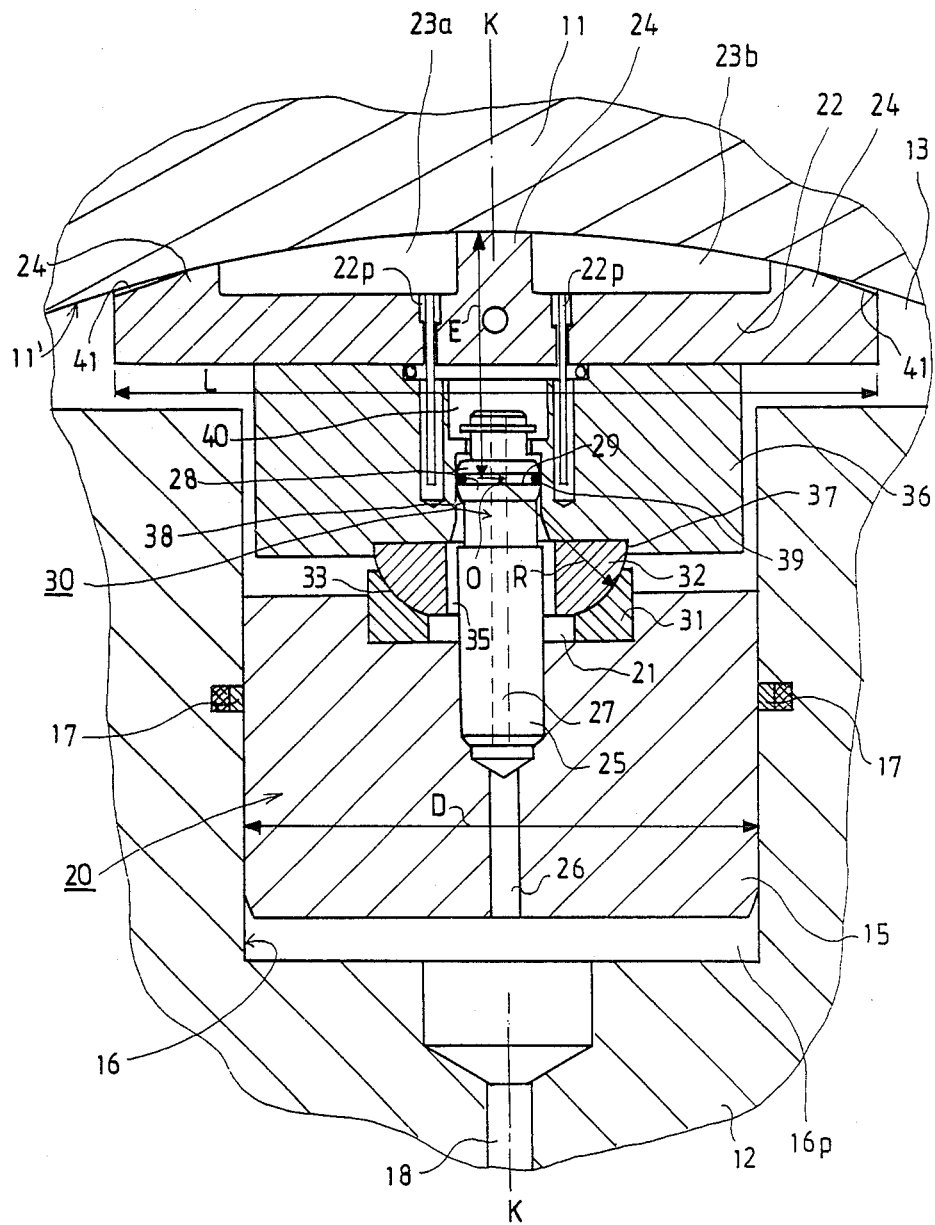
FIG. 3 is a partial sectional view along line II—II of FIG. 1 on a larger scale than FIG. 2.

The overall construction of a variable-crown roll adjustable in zones and illustrated FIGS. 1, 2 and 3 will be initially described, such construction being principally known in the prior art. The roll 10, e.g. a press roll or calender roll for a paper machine, comprises a rotating cylinder mantle 11 within which there is a stationary massive axle 12. A sufficiently large free space 13 remains between the inner face 11' of the mantle 11 and the axle 12. The mantle 11 is journalled by means of bearings 13a and 13b on axle journals 12a and 12b which constitute extensions of the axle 12. The mantle 11 is closed by end flanges 14a and 14b. The roll mantle 11 is driven through a drive mechanism (not illustrated).

Another, counter-roll 50 is provided opposite the roll 10, the rolls 10 and 50 forming together, e.g., a press nip N. A piston-loading shoe combination $20_1$-$20_N$ is provided between the axle 12 and the inner face 11' of the mantle 11 in accordance with the present invention, by which the linear load in the nip N can be adjusted in zones and compensated to the desired level, e.g. so as to provide a uniformly-distributed linear load.

The principal construction of a piston-shoe arrangement situated between the axle 12 and the roll mantle 11 in accordance with the present invention, will be described as follows.

A separately-adjustable pressure of appropriate magnitude is passed into each substantially cylindrical bore 16 formed in the axle 12, from an external pressure source (not illustrated) through respective fluid ducts 18. There is a piston 15 of, e.g., substantially circular cross-section in each substantially cylindrical bore 16. A loading shoe 22 is individually connected to each respective piston 15. The loading shoes 22 are identical with one another and are axially spaced as close as possible so that a uniform load is provided on the cylinder mantle 11, even with high compensation forces. The shoes 22 include, e.g., two hydrostatic lubrication chambers 23a and 23b. Ridges 24 are situated between the lubrication chambers 23a and 23b and also at the edges of the glide shoe 22 as illustrated in FIGS. 2 and 3. The ridges 24 together with the lubrication chambers 23a and 23b form a lubricated glide face against the smooth inner face 11' of the mantle 11. Lubrication oil is passed into the hydrostatic lubrication chambers 23a and 23b from a pressure space 16p in the piston 15 through a bore 26 in the piston 15 as well as through a sealed articulation or support joint arrangement 30, in accordance with the present invention which will be described in more detail below.

A preferred, exemplary embodiment will be described in detail as follows, with reference principally made to FIG. 3.

At the same time, the support joint arrangement 30 in accordance with the present invention is situated between the glide shoe 22 and the loading piston 15. This arrangement 30 functions as a pressure-tight fitting, by means of which the pressurized fluid is passed from the pressure space 16p in the substantially cylindrical bore 16 of the loading piston 15, and into the lubrication chambers 23a and 23b on the glide shoe 22. A projection piece 36 is attached to the plane face of the glide shoe 22 opposite to the glide face thereof, with sufficiently wide play inside the substantially cylindrical bore 16. A bearing piece 32 is fixed in a shallow bore 37 in the lower side of the projection piece 36. A second bearing piece 31 is fixed in a bore 21 in the (plane outer) end face of the piston 15. The bearing pieces 31 and 32 have substantially spherical bearing faces 33 facing one another, with a journalling centre being denoted by O in FIG. 3, and a journalling radius thereof with R. Bearing 31 has a concave bearing face and bearing 32 has a convex bearing face, the center of curvature being located on the side of the glide shoe 22 as illustrated.

The piston 15 has a central bore 26, having a wider part thereof in which a pin 25 is fixed, the pin 25 extending substantially centrally through the bearing 31, 32, 33 (i.e. through inner holes 35 therein) and into a central bore 38 in the projection piece 36 of the glide shoe 22. In the portion of the pin 25 that is situated inside the projection piece 36 of the glide shoe 22, there are two ring-shaped flanges 28, a groove 29 between the flanges 28, and a seal ring 39, e.g. of rubber, fitted into the groove 29. A bore 27 passes through the pin 25, one end of the bore 27 being connected or communicating with the bore 26 in the piston 15, and the other end connected or communicating with a space 40 in the projection piece 36 of the glide shoe 22. Bores 22p in the glide shoe 22 which communicate with hydrostatic lubrication spaces 23a and 23b, also open into the space 40.

From the pressure space 16p of the cylinder bore 16 loading the piston 15, the pressure fluid passes along the route 26-27-40-22p into the spaces 23a and 23b on the glide shoe 22, so as to hydrostatically lubricate the glide face between the glide shoe 22 and the inner face 11' of the roll mantle 11. The route of the pressure fluid is sealed at the joint of the combination 30 by the ring seal 39 of the pin 25 against the inner face of the bore 38 in the projection part 36.

According to the present invention, the centre of curvature or rotation 0 of the spherical bearing 31, 32, 33 of the piston 15 and of the glide shoe 22 is situated at the level of the seal 39 of the piston 15 pin 25 (i.e. in substantially the same plane as illustrated), so that when the glide shoe 22 and its fixed projection part 36 thereof pivot relative to the piston 15, the seal 39 moves very little relative to the wall of the bore 38 in the projection part 36, and a simple and reliable seal construction is thereby obtained. According to the invention, the centers of curvature or rotation 0 in the combinations $20_1$-$20_N$ of the pistons 15 and of the glide shoes 22, are situated as close as possible to the glide face between the glide shoe 22 and the mantle 11, for the reasons noted above.

As illustrated in FIG. 3, the bores 26 in the piston 15, the projection part (pin) 25, and the bore 27 therein are all substantially situated on a center line K—K of the cylinder bore 16. The projection 25 is substantially cylindrically-shaped with a center axis substantially coinciding with a center axis of the substantially cylindrical bore 16 for the piston 15.

The pistons 15 are sealed by seal rings 17 in the respective cylinder bores 16. The joint arrangement 30 guarantees that, inspite of relative changes in position between the central axle 12 and the mantle 11, the glide contact of the glide shoe remains correct and that moreover, the pistons 15 are not stuck in their respective bores 16.

The glide shoe arrangement in accordance with the present invention is intended for use in connection with such glide shoes in which a partially, preferably mainly hydrostatic lubrication is used. It is also possible to use partial hydrodynamic lubrication in the glide shoes, which is evidenced by provision of chamferings 41 at edges of the glide faces on the glide shoes 22. Such chamferings 41, together with the inner face 11' of the mantle 11, define wedge spaces in which a dam pressure of lubricant is produced, and by means of which the glide face may also be partially hydrodynamically lubricated if necessary.

In FIG. 3, the glide-shoe arrangement is illustrated with correct proportions and in a scale of 1:1.5. In FIG. 3, the length of the glide shoe in the direction of rotation of the roll mantle 11 is denoted by L, the diameter of the loading piston 15 by D, the radius of the spherical bearing by R, and the perpendicular distance of the journalling centre 0 of the spherical bearing from the glide face of the mantle 11 by E. Within the scope of the present invention, these dimensions are, as a rule, within the ranges of D=about 50 to 200 mm., E=about 20 to 80 mm., L=about 100 to 300 mm., and R=about 20 to 50 mm.

When dimensions R and E required for the invention are proportioned to the width L of the glide shoe 22, then it has been ascertained preferably L/R>about 3, more preferably L/R=about 4–6, and L/E preferably>about 2, more preferably L/E=about 2.5–4. If the dimensions R and E are proportioned to the diameter D of the loading piston 15, then it has been ascertained that D is preferably substantially larger than dimensions R and E, more preferably several times larger than the journalling radius R and the distance E.

The construction described above principally operates as follows. The axle 12 is pressed through articulated bearings (not illustrated) attached to the axle journals 12a and 12b against the counter-roll 50, so as to load the nip N whereby the axle 12 is deflected at the same time. In order to control the distribution (profile) of the nip pressure N in zones, a fluid pressure of adjustable magnitude is applied through the ducts 18 so as to load the glide shoe-piston combinations $20_1$-$20_N$. This pressure presses the pistons 15 and the shoes 22 attached to the pistons 15 within the area of the nip N against the inner face 11' of the roll mantle 11.

The shoes 22 receive the lubrication oil therefor from the loading oil and pressure of the pistons 15, so that the pressure of the lubrication oil in the spaces 23a and 23b is proportional to the loading pressure of the pistons 15 and the shoes attached to the same. As the axle 12 is deflected because of the loading forces, the shoes 22 are able to be positioned in accordance with the mantle 11 and the pistons 15 in accordance with the central axle 12, because the pistons 15 and the shoes 22 are interconnected through the sealing/support joint arrangement 30. The shoes 22 are also capable of being positioned, in the cross-sectional plane of the roll 10, about the spherical joint or bearing 31, 32, 33, with this positioning not being interfered with by the sealed passage of the lubrication oil into the chambers 23a and 23b on the shoes 22.

The preceding description of the present invention is merely exemplary, and is not intended to limit the scope thereof in any way.

I claim:

1. A glide shoe arrangement for a variable crown roll comprising a non-rotating central axle on which a substantially cylindrical roll mantle is rotatably journalled, at least one piston-glide shoe combination fitted between the axle and an inner face of the roll mantle and including a loaded piston and a glide shoe adapted to be loaded against the inner face of the roll mantle by hydraulic pressure acting on said piston for controlling distribution of pressure in a nip facing the glide shoe, said piston-glide shoe combination including a cylinder bore formed in the axle into which the loading piston is fitted, wherein a bearing is situated between the piston and glide shoe having a substantially spherical bearing face, the center of curvature thereof being situated on the glide shoe side of said bearing, a pin-shaped projection is fitted in the loading piston and extends through the bearing, a sealing articulation arrangement is situated between said pin-shaped projection and one of said glide shoe and a projecting portion thereof, and hydraulic pressure fluid passage means for providing communication between a loading space defined by said piston and cylinder bore through said pin-shaped projection and into a hydrostatic lubrication space on the glide shoe facing the inner face of the roll mantle.

2. The arrangement of claim 1, wherein said pin-shaped projection is substantially in the shape of a cylinder having a central axis substantially coinciding with a central axis of said cylinder bore in the axle in which the piston is fitted and which is also substantially cylindrically-shaped.

3. The arrangement of claim 2, wherein said sealing articulation arrangement comprises
   a pair of ring-shaped flanges extending circumferentially around said substantially cylindrical projection defining a circumferential groove between them opening towards said glide shoe; and
   a sealing ring fitted into said groove for sealing the combination between the piston and glide shoe.

4. The arrangement of claim 3, wherein said sealing ring and the center of curvature of the bearing surface are both situated in substantially the same plane.

5. The arrangement of claim 1, wherein said piston has a surface facing said glide shoe in which a bore is formed, a bearing ring seated in said bore having a concave countersurface receiving the spherical surface bearing, and wherein said spherical surface bearing is affixed to one of an inner surface of the glide shoe and an inner side of a projecting portion of the glide shoe, or seated within a bore in the glide shoe or projecting portion thereof, and
   said pin-shaped projection extends through an inner opening in said bearing.

6. The arrangement of claim 3, wherein said glide shoe is provided with a projecting portion which fits loosely within an outer part of the cylinder bore, said projecting portion being provided with a substantially central bore formed therein into which said pin-shaped projection extends and against a surface of which said sealing ring of said pin-shaped projection seals said combination.

7. The arrangement of claim 6, wherein said projecting portion of said glide shoe comprises a space,
   said piston comprises a bore therethrough, and
   said pin-shaped projection comprises a bore which opens at one end thereof into said glide shoe space and which at an opposite end thereof communicates with said loading space through said piston bore, and
   said glide shoe additionally comprises at least one additional bore communicating said hydrostatic lubrication space and said glide shoe space with one another.

8. The arrangement of claim 1, wherein
   a ratio of a length L of the glide shoe in a direction of rotation of the roll mantle to a journalling radius R of curvature of the bearing spherical surface is L/R > about 3.

9. The arrangement of claim 8, wherein L/R is about 4–6.

10. The arrangement of claim 8, wherein a ratio of the glide shoe length L to a perpendicular distance thereof E from the center of curvature of the bearing spherical surface to an outer glide face of the glide shoe is L/E > about 2.

11. The arrangement of claim 10, wherein L/E is about 2.5–4.

12. The arrangement of claim 10, wherein a diameter D of the loading piston in the direction of rotation of the mantle is substantially larger than the radius R and the distance E.

13. The arrangement of claim 1, comprising several piston-shoe combinations, each situated within a respective bore in the axle.

14. The arrangement of claim 8, wherein L = about 100 to 300 mm and R = about 20 to 50 mm.

15. The arrangement of claim 10, wherein L = about 100 to 300 mm and E = about 20 to 80 mm.

16. The arrangement of claim 12, wherein D = about 50 to 200 mm, E = about 20 to 80 mm, and R = about 20 to 50 mm.

* * * * *